US012764512B2

(12) United States Patent
Abukawa et al.

(10) Patent No.: US 12,764,512 B2
(45) Date of Patent: Oct. 13, 2026

(54) WIRELESS COMMUNICATION SYSTEM AND CONTROL METHOD OF WIRELESS COMMUNICATION SYSTEM

(71) Applicant: JVCKENWOOD Corporation, Yokohama (JP)

(72) Inventors: Tetsuya Abukawa, Yokohama (JP); Tomonori Nagahama, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 214 days.

(21) Appl. No.: 18/822,527

(22) Filed: Sep. 3, 2024

(65) Prior Publication Data

US 2024/0430658 A1 Dec. 26, 2024

Related U.S. Application Data

(63) Continuation of application No. PCT/JP2023/005977, filed on Feb. 20, 2023.

(30) Foreign Application Priority Data

Mar. 16, 2022 (JP) ................................ 2022-041862

(51) Int. Cl.

*H04W 4/90* (2018.01)
*H04W 72/20* (2023.01)

(52) U.S. Cl.

CPC ............. *H04W 4/90* (2018.02); *H04W 72/20* (2023.01)

(58) Field of Classification Search

CPC ......... H04W 4/90; H04W 72/20; H04W 4/20; H04W 60/00; H04W 88/06; H04W 4/02;

(Continued)

(56) References Cited

U.S. PATENT DOCUMENTS

| | | | | |
|---|---|---|---|---|
| 8,634,799 B1 * | 1/2014 | Economy | ............. | H04W 48/18 455/420 |
| 2012/0190295 A1 * | 7/2012 | Kim | ....................... | G06Q 50/26 455/3.01 |

(Continued)

FOREIGN PATENT DOCUMENTS

| | | |
|---|---|---|
| JP | 2013-518501 | 5/2013 |
| JP | 2018-093410 | 6/2018 |
| WO | 2019/064687 | 4/2019 |

OTHER PUBLICATIONS

International Search Report and Written Opinion for International Application Serial No. PCT/JP2023/005977 mailed on Apr. 11, 2023, 9 pages.

*Primary Examiner* — Nimesh Patel
(74) *Attorney, Agent, or Firm* — Amin, Turocy & Watson, LLP

(57) ABSTRACT

A wireless communication system includes a management device which receives an audio signal and position information from wireless communication terminals by a first wireless communication system, determines whether an emergency situation signal has been received, decides an emergency-situation influence range, specifies a transmission-destination communication terminal for a control signal, and transmits information to an operator terminal and the control signal to the transmission-destination communication terminal by the first wireless communication system, the operator terminal which receives, by the first wireless communication system, the position information and the audio signal and the transmission-destination information, and transmits, by a second wireless communication system, an audio signal of the operator terminal to the wireless communication terminal, and the wireless communication terminal which transmits the audio signal to the management device to generate the control signal and receives the control (Continued)

signal from the management device, and transmits/receives the audio signal to/from the operator terminal.

5 Claims, 9 Drawing Sheets

(58) Field of Classification Search
CPC ..... H04W 4/029; H04W 76/50; H04W 4/021; H04W 64/00; H04W 68/02; H04W 4/023; H04W 76/00; H04W 84/042; H04W 84/08; H04W 4/38; H04W 12/63; H04W 84/12; H04W 64/003; H04W 16/18; H04W 48/04; H04W 12/104; H04W 24/04; H04W 72/56; H04W 24/02; H04W 76/15; H04W 84/18; H04W 72/02; H04W 4/70; H04W 4/025; H04W 4/50; H04W 88/02; G08B 25/10; G08B 27/00; H04M 1/575; H04M 1/0266; H04M 2242/04; H04M 3/5116; H04M 1/72418; H04M 2242/30; H04M 11/04; H04M 7/006; H04M 2201/50; H04M 3/42348; H04M 2250/12; H04M 3/5166; H04M 1/72457; H04M 1/72421; H04M 2242/14; H04M 3/42; H04M 2207/18; G01S 1/02; G01S 1/08; G01S 5/0284; G01S 5/02; G01S 5/14; G01S 5/0036; G01S 2205/008; G01S 5/0027; G01S 5/04; G01S 2205/006; G01S 2205/06; G01S 3/02; G01S 5/0231
See application file for complete search history.

(56) References Cited

U.S. PATENT DOCUMENTS

| | | | | |
|---|---|---|---|---|
| 2012/0295575 | A1 | 11/2012 | Nam | |
| 2020/0029266 | A1 * | 1/2020 | Hata | H04W 36/0066 |
| 2020/0221012 | A1 | 7/2020 | Nishioka | |
| 2021/0314441 | A1 * | 10/2021 | Massie | G10L 15/26 |
| 2022/0201456 | A1 * | 6/2022 | Chiang | G06F 40/58 |
| 2023/0081455 | A1 * | 3/2023 | Myneni | H04W 72/56 370/329 |
| 2024/0064236 | A1 * | 2/2024 | Manzanillo | H04M 7/0081 |

* cited by examiner

WIRELESS COMMUNICATION SYSTEM AND CONTROL METHOD OF WIRELESS COMMUNICATION SYSTEM

CROSS-REFERENCE TO RELATED APPLICATIONS

This application is a Continuation of PCT International Application No. PCT/JP2023/005977 filed on Feb. 20, 2023 which claims the benefit of priority from Japanese Patent Application No. 2022-041862 filed on Mar. 16, 2022, the entire contents of both of which are incorporated herein by reference.

FIELD OF THE INVENTION

The present application relates to a wireless communication system and a control method of a wireless communication system.

BACKGROUND OF THE INVENTION

A technique for judging whether a user carrying a wireless communication device is in an emergency situation is known. For example, Japanese Laid-open Patent Publication No. 2013-518501 A describes a technique for notifying a third party of occurrence of an emergency situation to a user when it is judged that the emergency situation has occurred to the user.

In a wireless communication system, when an emergency situation occurs, it is desirable to specify an influence range of the emergency situation, to specify a user located within the influence range, and to perform control so as to be able to immediately communicate with the user.

SUMMARY OF THE INVENTION

A wireless communication system and a control method of a wireless communication system are disclosed.

According to one aspect of the present application, there is provided a wireless communication system comprising a management device, an operator terminal, and at least one wireless communication terminal, wherein the management device comprising: a reception unit configured to receive, from at least one communication terminal having a first wireless communication system, an audio signal and position information by the first wireless communication system; a determination unit configured to determine whether or not a signal indicating an emergency situation has been received from the at least one communication terminal based on the audio signal of the communication terminal received by the reception unit; a decision unit configured to decide an influence range of the emergency situation based on a positional relationship of the at least one communication terminal when the determination unit determines that the emergency situation has occurred; a specification unit configured to specify a transmission destination communication terminal that is a transmission destination of a control signal including an emergency signal according to the emergency situation based on the influence range of the emergency situation decided by the decision unit; and a transmission unit configured to transmit, by the first wireless communication system, information determined by the determination unit to an operator terminal and the control signal to the transmission destination communication terminal specified by the specification unit; the operator terminal comprising: a communication unit configured to receive, by the first wireless communication system, the position information and the audio signal transmitted by the at least one wireless communication terminal and information on the transmission destination communication terminal specified by the specification unit in the management device, and to transmit, by a second wireless communication system different from the first wireless communication system, an audio signal of an operator of the operator terminal to the at least one wireless communication terminal; and a display configured to display the information on the transmission destination communication terminal; and the at least one wireless communication terminal comprising: a first communication unit configured to perform communication by the first wireless communication system; a second communication unit configured to perform communication by the second wireless communication system; and a controller configured to control the first communication unit and the second communication unit, wherein the first communication unit is further configured to transmit the audio signal to the management device to generate the control signal in the management device and receive the control signal from the management device; the controller is further configured to control the second communication unit based on the control signal; and the second communication unit is further configured to transmit/receive the audio signal to/from the operator terminal.

According to one aspect of the present application, there is provided a control method of a wireless communication system comprising a management device, an operator terminal, and at least one of wireless communication terminals, wherein the management device comprising: receiving, from the at least one communication terminal having a first wireless communication system, an audio signal and position information by a first wireless communication system; determining whether or not a signal indicating an emergency situation has been received from the at least one communication terminal based on the audio signal of the communication terminal received by the receiving; deciding an influence range of the emergency situation based on a positional relationship of the at least one communication terminal when the determining determines that the emergency situation has occurred; specifying a transmission destination communication terminal that is a transmission destination of a control signal including an emergency signal according to the emergency situation based on the influence range of the emergency situation decided by the decisioning; and transmitting, by the first wireless communication system, information determined by the determining to the operator terminal and the control signal to the transmission destination communication terminal specified by the specifying; the operator terminal comprising: receiving, by the first wireless communication system, the position information and the audio signal transmitted by the at least one wireless communication terminal and information on the transmission destination communication terminal specified by the specifying in the management device, and transmitting, by a second wireless communication system different from the first wireless communication system, an audio signal of an operator of the operator terminal to the at least one wireless communication terminal; and displaying the information on the transmission destination communication terminal; and the at least one wireless communication terminal comprising: performing communication by the first wireless communication system by controlling a first communication unit; and performing communication by the second wireless communication system by controlling a second communication unit; transmitting the audio signal to the management device to generate the control signal in the management device and receiving the control signal from the management device by the first communication unit; controlling the second communication unit based on the control signal; and transmitting/receiving the audio signal to/from the operator terminal by the second communication unit.

The above and other objects, features, advantages and technical and industrial significance of this application will be better understood by reading the following detailed description of presently preferred embodiments of the application, when considered in connection with the accompanying drawings.

DETAILED DESCRIPTION OF THE INVENTION

Figure 1:
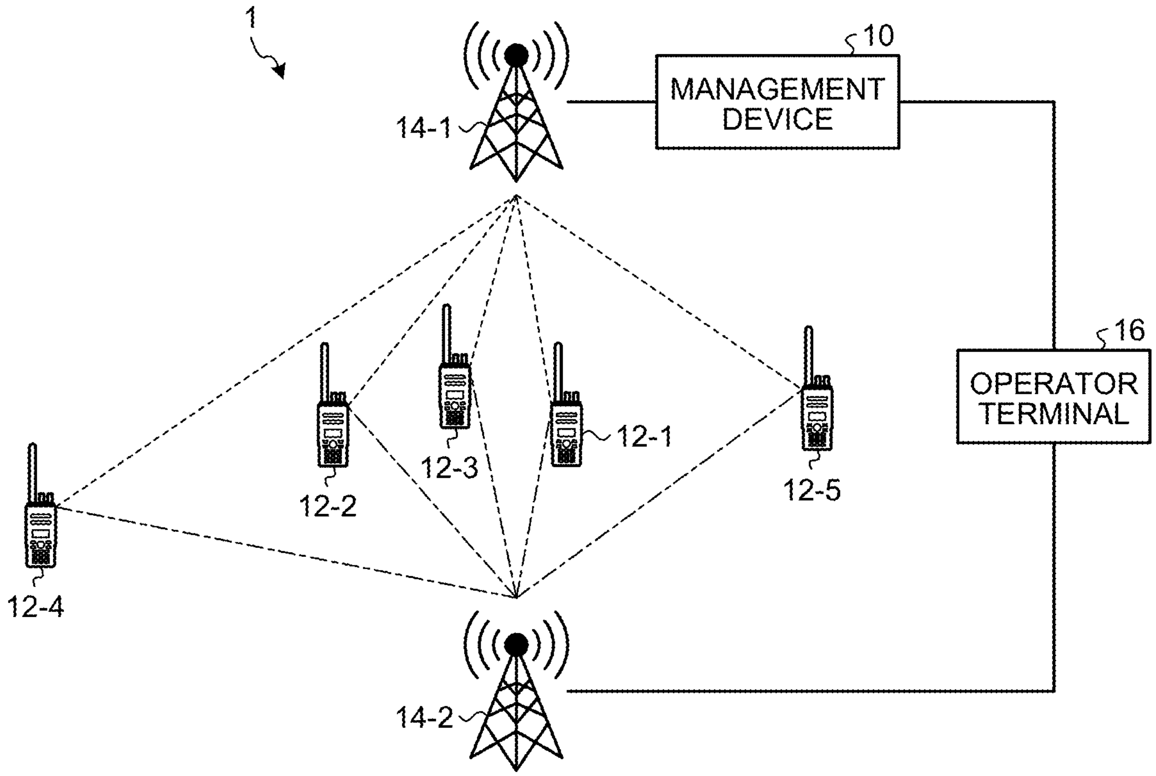
FIG. 1 is a diagram illustrating a configuration example of a wireless communication system according to an embodiment.

Hereinafter, an embodiment according to the present application will be described in detail with reference to the accompanying drawings. Note that the present application is not limited by this embodiment, and in the following embodiment, the same parts are denoted by the same reference numerals, and redundant description will be omitted.

Embodiment

Wireless Communication System

A configuration example of a wireless communication system according to an embodiment will be described with reference to FIG. 1. FIG. 1 is a diagram illustrating a configuration example of a wireless communication system according to the embodiment.

As illustrated in FIG. 1, the wireless communication system 1 includes a management device 10, a communication terminal 12-1, a communication terminal 12-2, a communication terminal 12-3, a communication terminal 12-4, a communication terminal 12-5, a base station 14-1, a base station 14-2, and an operator terminal 16. In the example illustrated in FIG. 1, the wireless communication system 1 includes five communication terminals from the communication terminal 12-1 to the communication terminal 12-5, but this does not limit the present application. The communication terminal 12-1 to the communication terminal 12-5 may be collectively referred to as a communication terminal 12.

The wireless communication system 1 is a wireless communication system compatible with a first wireless communication system and a second wireless communication system. The first wireless communication system is, for example, a wireless communication system corresponding to a communication standard such as 4G (fourth generation mobile communication system) and 5G (fifth generation mobile communication system). The second wireless communication system is, for example, a wireless communication system corresponding to digital commercial radio such as the APCO-P25 (Association of Public safety Communications Officials international Project 25) and the NXDN (registered trademark). The first wireless communication system and the second wireless communication system are not limited thereto.

The management device 10 determines whether or not the communication terminal 12 is in an emergency situation based on information transmitted from the communication terminal 12 via the base station 14-1 by the first wireless communication system. The emergency situation refers to a situation in which it is necessary to assist the user of the communication terminal 12 attacked by a burglar or the like. The emergency situation is not limited to the case of being attacked by a robber or the like. When it is determined that the communication terminal 12 is in an emergency situation, the management device 10 controls communication performed by the communication terminal by the second wireless communication system via the base station 14-2. Specifically, the management device 10 specifies the communication terminal 12 in the emergency situation, determines an influence range of the emergency, and controls communication of the communication terminal 12 of the user within the influence range by the second wireless communication system. More specifically, the management device 10 establishes communication between the communication terminal 12 of the user within the influence range and the operator terminal 16, and starts a call between the user and an operator.

Management Device

Figure 2:
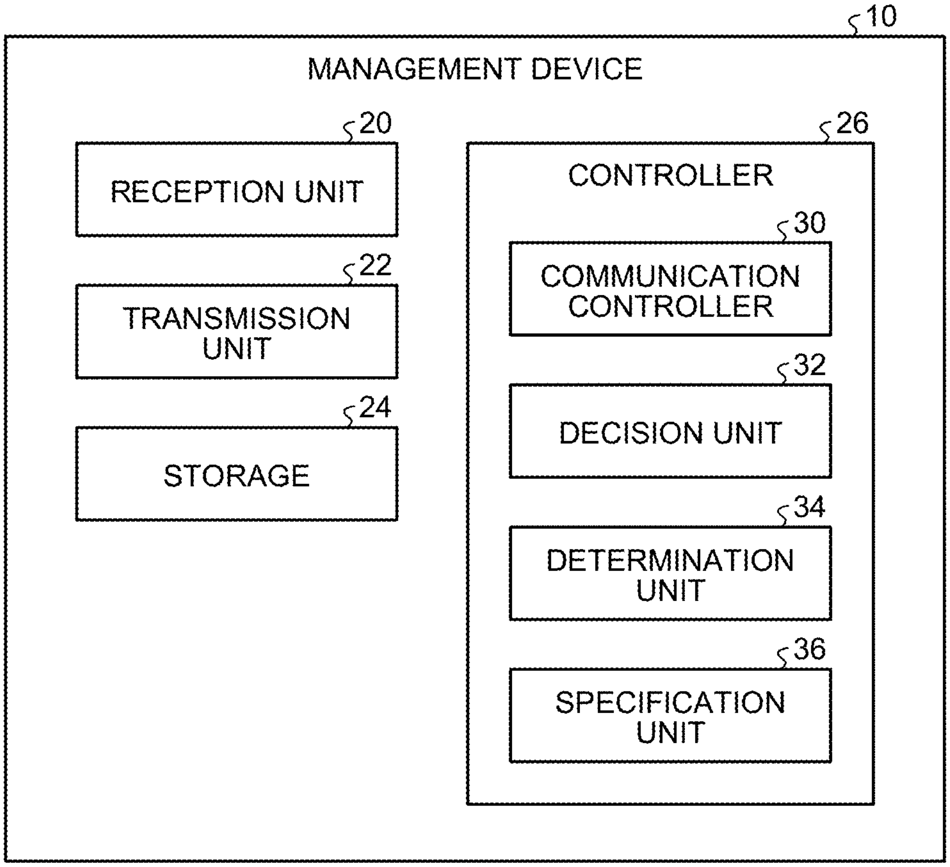
FIG. 2 is a block diagram illustrating a configuration example of a management device according to the embodiment.

A configuration example of a management device according to the embodiment will be described with reference to FIG. 2. FIG. 2 is a block diagram illustrating a configuration example of the management device according to the embodiment.

As illustrated in FIG. 2, the management device 10 includes a reception unit 20, a transmission unit 22, a storage 24, and a controller 26. The management device 10 is, for example, a server device disposed in a control center or the like that monitors communication by the first wireless communication system.

The reception unit 20 receives various types of information by the first wireless communication system under control of a communication controller 30. The reception unit 20 acquires, for example, an audio signal and position information from the communication terminal 12 of the wireless communication system 1 by the first wireless communication system.

The transmission unit 22 transmits various types of information by the first wireless communication system under the control of a communication controller 30. The transmission unit 22 transmits, for example, a control signal for controlling communication of the second wireless communication system for the communication terminal 12 to the communication terminal 12 of the wireless communication system 1 by the first wireless communication system.

The storage 24 stores various types of information. The storage 24 stores information such as calculation content of the controller 26 and a program. The storage 24 includes, for example, at least one of a random access memory (RAM), a main storage device such as a read only memory (ROM), and an external storage device such as a hard disk drive (HDD).

The controller 26 controls each of units of the management device 10. The controller 26 includes, for example, an information processing device such as a central processing unit (CPU) or a micro processing unit (MPU), and a storage device such as a RAM or a ROM. The controller 26 executes a program for controlling an operation of the management device 10 according to the present application. The controller 26 may be realized by, for example, an integrated circuit such as an application specific integrated circuit (ASIC) or a field programmable gate array (FPGA). The controller 26 may be realized by a combination of hardware and software.

The controller 26 includes a communication controller 30, a determination unit 32, a decision unit 34, and a specification unit 36.

The communication controller 30 controls the reception unit 20 and the transmission unit 22. The communication controller 30 controls the reception unit 20 to receive various types of information transmitted to the management device 10 by the first wireless communication system. The communication controller 30 controls the transmission unit 22 to transmit various types of information to various external devices by the first wireless communication system.

The determination unit 32 determines whether or not an emergency situation has occurred in the communication terminal 12. The determination unit 32 determines whether or not an emergency situation has occurred in the communication terminal 12 based on an audio signal received from the communication terminal 12. Details of the determination unit 32 will be described later.

The decision unit 34 decides the influence range of the emergency situation. The decision unit 34 decides the influence range of the emergency situation occurred in the communication terminal 12 based on a positional relationship of the communication terminal 12 determined by the determination unit 32. The decision unit 34 decides the influence range according to the type of the emergency situation that has occurred in the communication terminal 12. Details of the decision unit 34 will be described later.

The specification unit 36 specifies a transmission destination communication terminal which is a transmission destination of a control signal for controlling communication by the second wireless communication system among the communication terminals 12. The specification unit 36 specifies the transmission destination communication terminal based on the influence range decided by the decision unit 34. Details of the specification unit 36 will be described later.

Communication Terminal

Figure 3:
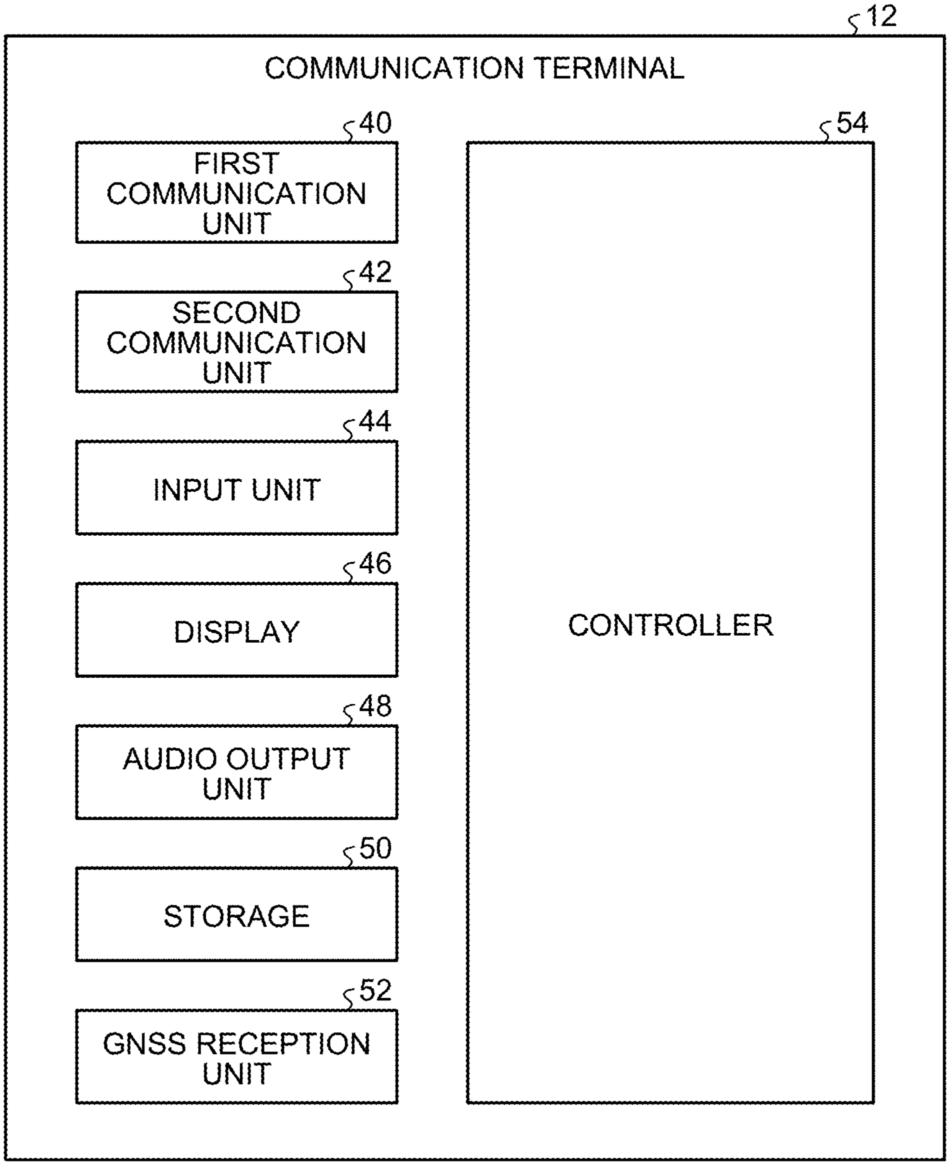
FIG. 3 is a block diagram illustrating a configuration example of a communication terminal according to the embodiment.

A configuration example of the communication terminal according to the embodiment will be described with reference to FIG. 3. FIG. 3 is a block diagram illustrating a configuration example of the communication terminal according to the embodiment.

As illustrated in FIG. 3, the communication terminal 12 includes a first communication unit 40, a second communication unit 42, an input unit 44, a display 46, an audio output unit 48, a storage 50, a global navigation satellite system (GNSS) reception unit 52, and a controller 54.

The communication terminal 12 is a communication terminal compatible with two communication systems, that is, the first wireless communication system and the second wireless communication system. The communication terminal 12 is, for example, a commercial-use wireless communication device, but is not limited thereto.

The first communication unit 40 communicates with the base station 14-1 by the first wireless communication system. The first communication unit 40 transmits, for example, an audio signal for an audio input to the input unit 44 and information on a current position of the communication terminal 12 to the base station 14-1 by the first wireless communication system. The first communication unit 40 receives a control signal for the second communication unit 42 from the management device 10 via the base station 14-1 by the first communication wireless system.

The second communication unit 42 communicates with the base station 14-2 by the second wireless communication system. The second communication unit 42 transmits, for example, an audio signal related to a voice of the user of the communication terminal 12 input to the input unit 44 to the base station 14-2 by the second wireless communication system.

The input unit 44 receives various input operations to the communication terminal 12. The input unit 44 outputs an operation signal corresponding to the received input operation to the controller 54. The input unit 44 includes, for example, a touch panel, a button, a switch, a microphone, and the like. In a case where a touch panel is used as the input unit 44, the input unit 44 is arranged on the display 46.

The display 46 displays various videos. The display 46 is a display including, for example, a liquid crystal display (LCD), an organic electro-luminescence (EL), and the like.

The audio output unit 48 is a speaker that outputs various kinds of audio. The audio output unit 48 outputs, for example, a voice of the operator of the operator terminal 16. The audio output unit 48 outputs, for example, a voice of a conversation partner.

The storage 50 stores various types of information. The storage 50 stores information such as calculation content of the controller 54 and a program. The storage 50 includes, for example, at least one of a main storage device such as a ROM or a RAM, and an external storage device such as an HDD.

The GNSS reception unit 52 includes a GNSS receiver or the like that receives GNSS signals from GNSS satellites. The GNSS reception unit 52 outputs the received GNSS signals to the controller 54.

The controller 54 controls each of units of the communication terminal 12. The controller 54 includes, for example, an information processing device such as a CPU or an MPU, and a storage device such as a RAM or a ROM. The controller 54 executes a program for controlling the operation of the communication terminal 12 according to the present application. The controller 54 may be realized by, for example, an integrated circuit such as an ASIC or an FPGA. The controller 54 may be realized by a combination of hardware and software.

The controller 54 acquires an audio signal related to the audio input to the input unit 44. The controller 54 calculates position information on the current position of the communication terminal 12 based on the GNSS signals received by the GNSS reception unit 52.

Operator Terminal

Figure 4:
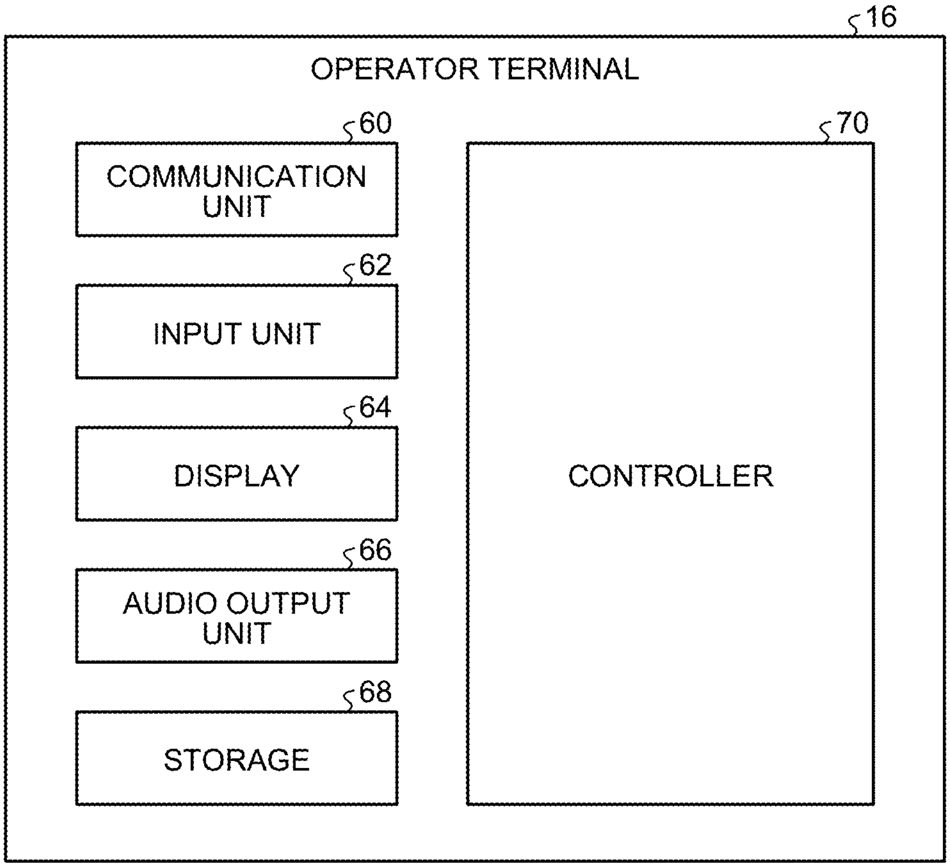
FIG. 4 is a block diagram illustrating a configuration example of an operator terminal according to the embodiment.

A configuration example of an operator terminal according to the embodiment will be described with reference to FIG. 4. FIG. 4 is a block diagram illustrating a configuration example of an operator terminal according to the embodiment.

As illustrated in FIG. 4, the operator terminal 16 includes a communication unit 60, an input unit 62, a display 64, an audio output unit 66, a storage 68, and a controller 70.

The operator terminal 16 is configured to be able to receive various types of information transmitted to the base station 14-1 by the first wireless communication system and various types of information transmitted to the base station 14-2 by the second wireless communication system. The operator terminal 16 is disposed, for example, in a control center that monitors the wireless communication system 1. The operator terminal 16 is, for example, an information processing device such as a personal computer (PC).

The communication unit 60 communicates with the management device 10 and the communication terminal 12. The communication unit 60 receives various types of information from the management device 10 and the communication terminal 12. The communication unit 60 receives, for example, emergency situation information indicating that the communication terminal 12 is in an emergency situation from the management device 10. The communication unit 60 receives, for example, an audio signal related to a voice of the communication terminal 12 from the communication terminal 12.

The input unit 62 receives various input operations to the operator terminal 16. The input unit 62 outputs an operation signal corresponding to the received input operation to the controller 70. The input unit 62 includes, for example, a keyboard, a mouse, a touch panel, a button, a switch, a microphone, and the like. In a case where a touch panel is used as the input unit 62, the input unit 62 is arranged on the display 64.

The display 64 displays various videos. The display 64 is, for example, a display including a liquid crystal display, an organic EL, and the like.

The audio output unit 66 is a speaker that outputs various kinds of audio. The audio output unit 66 outputs, for example, audio around the communication terminal 12 acquired by the communication terminal 12. The audio output unit 66 outputs, for example, a voice of the user of the communication terminal 12.

The storage 68 stores various types of information. The storage 68 stores information such as calculation content of the controller 70 and a program. The storage 68 includes, for example, at least one of a main storage device such as a ROM or a RAM, and an external storage device such as an HDD.

The controller 70 controls each of units of the operator terminal 16. The controller 70 includes, for example, an information processing device such as a CPU or an MPU, and a storage device such as a RAM or a ROM. The controller 70 executes a program for controlling the operation of the operator terminal 16 according to the present application. The controller 70 may be realized by, for example, an integrated circuit such as an ASIC or an FPGA. The controller 70 may be realized by a combination of hardware and software.

Processing Content

Figure 5:
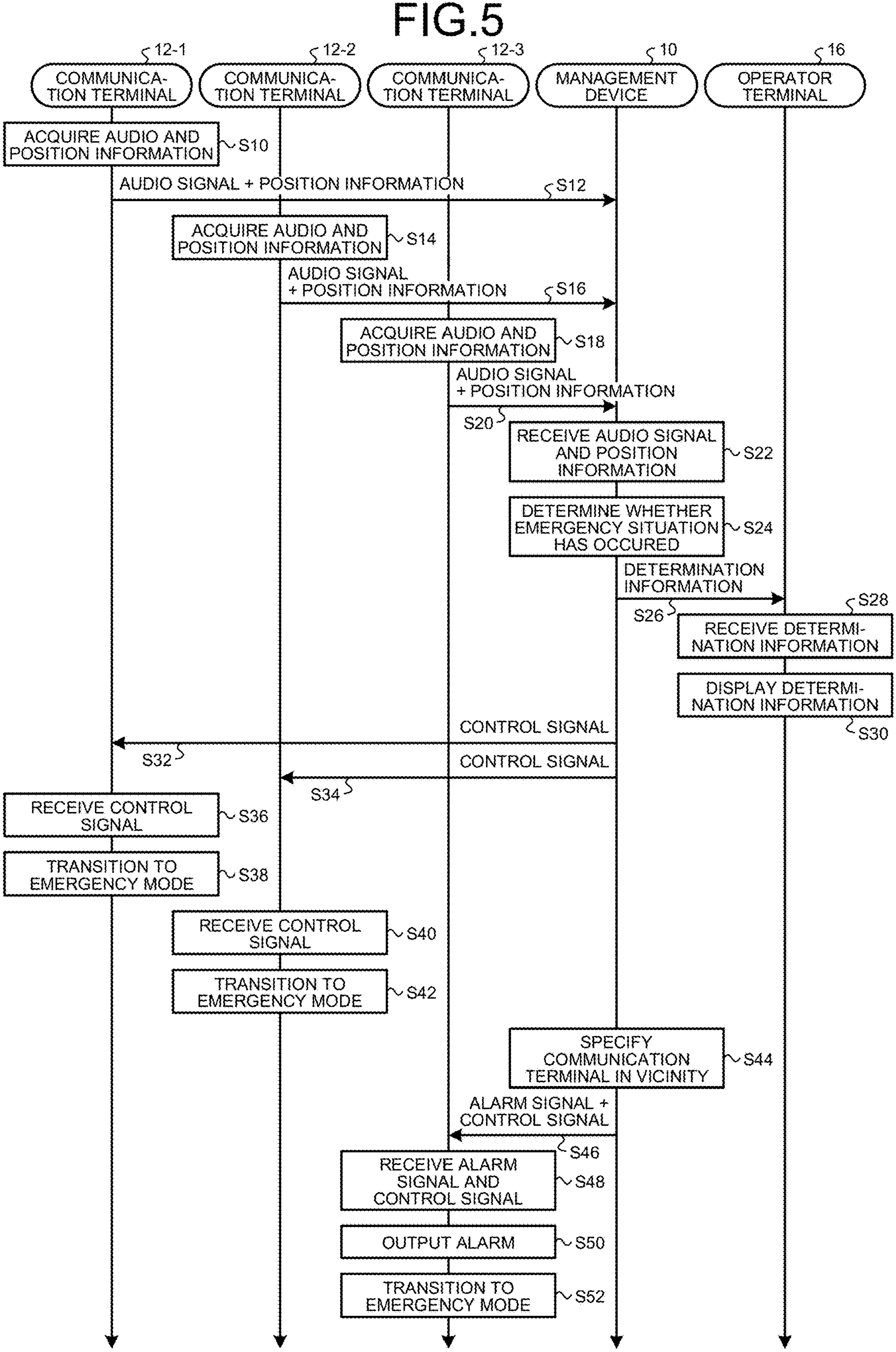
FIG. 5 is a sequence diagram illustrating a flow of processing of the wireless communication system according to the embodiment.

Processing of Wireless Communication System Processing contents of the wireless communication system according to the embodiment will be described with reference to FIG. 5. FIG. 5 is a sequence diagram illustrating a flow of processing of the wireless communication system according to the embodiment.

The processing illustrated in FIG. 5 indicates processing in a case where the communication terminal 12 includes three communication terminals 12-1 to 12-3, but this does not limit the present application. The processing illustrated in FIG. 5 indicates a flow of processing during a period from a time at which it is determined that an emergency situation has occurred to a time at which the communication terminal 12-1 to the communication terminal 12-3 transition to the emergency mode.

The controller 54 of the communication terminal 12-1 acquires surrounding audio and position information on the current position (Step S10). The controller 54 of the communication terminal 12-1 controls the first communication unit 40 to transmit an audio signal related to the acquired audio and the acquired position information to the management device 10 by the first wireless communication system (Step S12). The controller 54 of the communication terminal 12-1 always executes the processing of Steps S10 and S12.

The controller 54 of the communication terminal 12-2 acquires surrounding audio and position information on the current position (Step S14). The controller 54 of the communication terminal 12-2 controls the first communication unit 40 to transmit an audio signal related to the acquired audio and the position information to the management device 10 by the first wireless communication system (Step S16). The controller 54 of the communication terminal 12-2 always executes the processing of Steps S14 and S16.

The controller 54 of the communication terminal 12-3 acquires surrounding audio and position information on the current position (Step S18). The controller 54 of the communication terminal 12-3 controls the first communication unit 40 to transmit an audio signal related to the acquired audio and the position information to the management device 10 by the first wireless communication system (Step S20). The controller 54 of the communication terminal 12-3 always executes the processing of Steps S18 and S20.

Under the control of the communication controller 30, the reception unit 20 of the management device 10 receives the audio signals and the position information from the communication terminal 12-1, the communication terminal 12-2, and the communication terminal 12-3 (Step S22).

The determination unit 32 of the management device 10 executes emergency situation determination processing for determining whether or not an emergency situation has occurred in the communication terminal 12-1 to the communication terminal 12-3 (Step S24). Details of the emergency situation determination processing will be described later. Here, it is assumed that it is determined that an emergency situation has occurred in the communication terminal 12-1 and the communication terminal 12-2, and it is determined that no emergency situation has occurred in the communication terminal 12-3. The determination unit 32 of the management device 10 generates determination information on a determination result of the emergency situation. The transmission unit 22 of the management device 10 transmits the determination information to the operator terminal 16 according to the control of the communication controller 30 (Step S26).

The communication unit 60 of the operator terminal 16 receives the determination information from the management device 10 according to the control of the controller 70 (Step S28). The controller 70 of the operator terminal 16 displays the determination information on the display 64 (Step S30). As a result, the operator of the operator terminal 16 can grasp the communication terminal 12 determined as being in an emergency situation.

Under the control of the communication controller 30, the transmission unit 22 of the management device 10 transmits a control signal for controlling communication of the second wireless communication system of the communication terminal 12-1 to the communication terminal 12-1 by the first wireless communication system (Step S32). Under the control of the communication controller 30, the transmission unit 22 of the management device 10 transmits a control signal for controlling communication of the second wireless communication system of the communication terminal 12-2 to the communication terminal 12-2 by the first wireless communication system (Step S34). The control signal by the management device 10 may include a command for causing the communication terminal 12-1 and the communication terminal 12-2 to execute a function according to a type and a circumstance of the emergency situation. For example, the control signal by the management device 10 may include a command not to output audio related to the audio signal received from the operator terminal 16 to the communication terminal 12-1 and the communication terminal 12-2. As a result, it is possible to prevent the audio from being heard by persons around the communication terminal 12-1 and the communication terminal 12-2. Note that the control signal by the management device 10 may include a command for executing other functions.

The first communication unit 40 of the communication terminal 12-1 receives a control signal from the management device 10 under the control of the controller 54 (Step S36). The controller 54 of the communication terminal 12-1 causes the communication terminal 12-1 to transition to an emergency mode (emergency situation mode) according to the control signal received from the management device 10 (Step S38). Upon transition to the emergency mode, transmission and reception of an audio signal by the second wireless communication system is automatically started. The communication terminal 12 transitioned to the emergency mode starts processing of transmitting the position information of the current position by two wireless communication systems, that is, the first wireless communication system and the second wireless communication system, at all times.

The first communication unit 40 of the communication terminal 12-2 receives a control signal from the management device 10 under the control of the controller 54 (Step S40). The controller 54 of the communication terminal 12-2 causes the communication terminal 12-2 to transition to the emergency mode according to the control signal received from the management device 10 (Step S42).

The specification unit 36 of the management device 10 specifies a communication terminal in the vicinity of the communication terminal 12-1 or the communication terminal 12-2 based on the position information of each of the communication terminals 12 (Step S44). In the present embodiment, the vicinity refers to, for example, a range within 100 m, but is not limited thereto. Here, it is assumed that the communication terminal 12-3 is specified as the communication terminal in the vicinity of the communication terminal 12-1 or the communication terminal 12-2.

Under the control of the communication controller 30, the transmission unit 22 of the management device 10 transmits an alarm signal and a control signal for controlling communication of the second wireless communication system of the communication terminal 12-3 by the first wireless communication system (Step S46). The alarm signal is a signal for notifying the user of the communication terminal 12-3 that a communication terminal in an emergency situation is present in the vicinity.

The first communication unit 40 of the communication terminal 12-3 receives the alarm signal and the control signal from the management device 10 under the control of the controller 54 (Step S48).

The controller 54 of the communication terminal 12-3 controls the audio output unit 48 according to the alarm signal received by the first communication unit 40 to output an alarm (Step S50). The controller 54 may control the display 46 to display information indicating that the communication terminal 12 in an emergency situation exists in the vicinity. The controller 54 of the communication terminal 12-3 causes the communication terminal 12-3 to transition to the emergency mode according to the control signal received from the management device 10 (Step S52).

In the wireless communication system 1, by executing the processing of FIG. 5, the communication terminal 12-1 to the communication terminal 12-3 transition to the emergency mode.

Processing of Wireless Communication System

Figure 6:
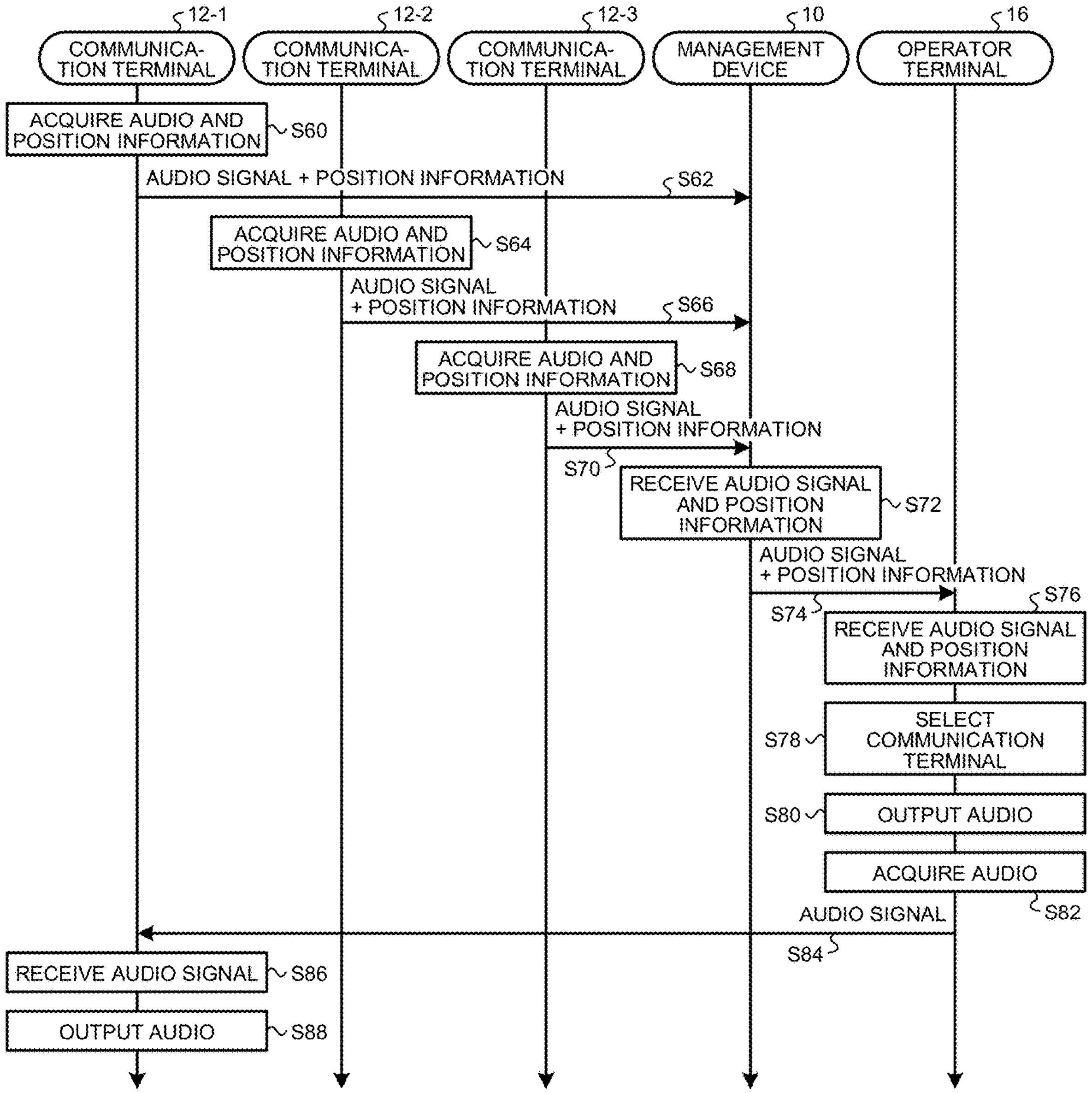
FIG. 6 is a sequence diagram illustrating a flow of processing of the wireless communication system according to the embodiment.

Processing contents of the wireless communication system according to the embodiment will be described with reference to FIG. 6. FIG. 6 is a sequence diagram illustrating a flow of processing of the wireless communication system according to the embodiment.

The processing illustrated in FIG. 6 indicates processing during a period from a time at which the communication terminal 12-1 to the communication terminal 12-3 have transitioned to the emergency mode to a time at which the communication terminal 12-1 to the communication terminal 12-3 receive a voice from the operator of the operator terminal 16.

The controller 54 of the communication terminal 12-1 acquires the audio input to the input unit 44 by the user and position information on the current position (Step S60). The controller 54 of the communication terminal 12-1 controls the first communication unit 40 and the second communication unit 42 to transmit an audio signal related to the acquired audio to the management device 10 by the second wireless communication system and transmit the position information to the management device 10 by the first wireless communication system (Step S62). The controller 54 of the communication terminal 12-1 executes the processing of Steps S60 and S62 during the emergency mode.

The controller 54 of the communication terminal 12-2 acquires the audio input to the input unit 44 by the user and position information on the current position (Step S64). The controller 54 of the communication terminal 12-2 controls the first communication unit 40 and the second communication unit 42 to transmit an audio signal related to the acquired audio to the management device 10 by the second wireless communication system and transmit the position information to the management device 10 by the first wireless communication system (Step S66). The controller 54 of the communication terminal 12-2 executes the processing of Steps S64 and S66 during the emergency mode.

The controller 54 of the communication terminal 12-3 acquires the audio input to the input unit 44 by the user and position information on the current position (Step S68). The controller 54 of the communication terminal 12-3 controls the first communication unit 40 and the second communication unit 42 to transmit an audio signal related to the acquired audio to the management device 10 by the second wireless communication system and transmit the position information to the management device 10 by the first wireless communication system (Step S70). The controller 54 of the communication terminal 12-3 executes the processing of Steps S68 and S70 during the emergency mode.

Under the control of the communication controller 30, the reception unit 20 of the management device 10 receives the audio signals and the position information from the communication terminal 12-1, the communication terminal 12-2, and the communication terminal 12-3 (Step S72). Under the control of the communication controller 30, the transmission unit 22 of the management device 10 transmits the audio signals and the position information received from the communication terminal 12-1 to the communication terminal 12-3 to the operator terminal 16 (Step S74).

The communication unit 60 of the operator terminal 16 receives the audio signals and the position information from the management device 10 according to the control of the controller 70 (Step S76). The controller 70 of the operator terminal 16 selects the communication terminal 12 that outputs an audio (Step S78). The controller 70 of the operator terminal 16 selects the communication terminal 12 that outputs an audio based on, for example, input information input to the input unit 62 by the operator. That is, the operator of the operator terminal 16 can arbitrarily select the communication terminal 12 that outputs an audio. In the processing illustrated in FIG. 6, it is assumed that the communication terminal 12-1 is selected.

The controller 70 of the operator terminal 16 causes the audio output unit 66 to output the audio of the user of the communication terminal 12-1 (Step S80). The controller 70 of the operator terminal 16 acquires audio of the operator input to the input unit 62 (Step S82). The controller 70 of the operator terminal 16 transmits the acquired audio signal related to the audio of the operator to the communication terminal 12-1 by the second wireless communication system (Step S84).

The second communication unit 42 of the communication terminal 12-1 receives the audio signal from the operator terminal 16 under the control of the controller 54 (Step S86). The controller 54 of the communication terminal 12-1 causes the audio output unit 48 to output the audio of the operator of the operator terminal 16 (Step S88). This enables a call between the user of the communication terminal 12-1 and the operator of the operator Note that, in the processing illustrated in FIG. 6, when the communication terminal 12-2 or the communication terminal 12-3 is selected in Step S78, a call between the user of the communication terminal 12-2 or the communication terminal 12-3 and the operator of the operator terminal 16 becomes possible.

terminal 16.

Processing of Management Device

Figure 7:
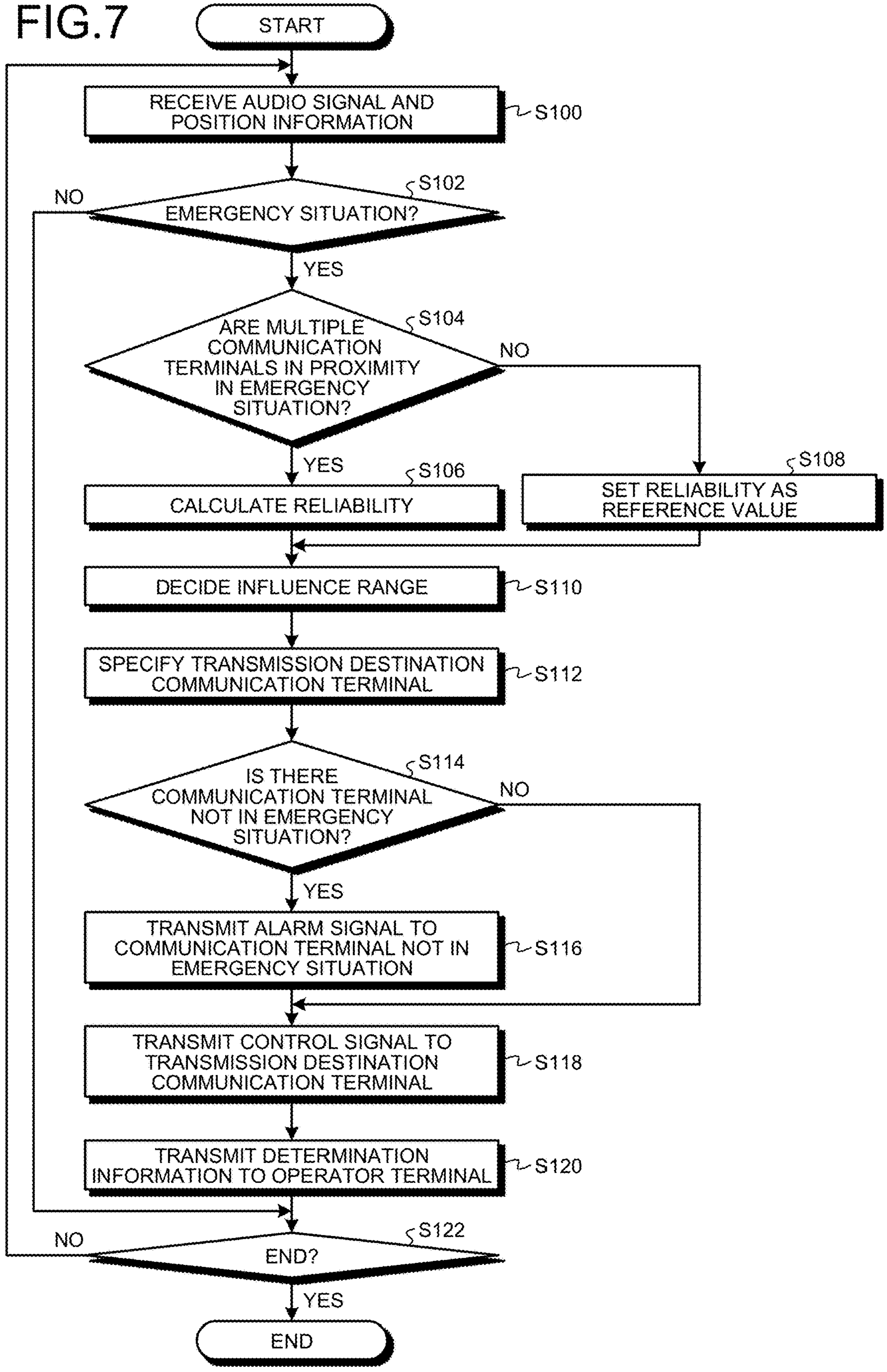
FIG. 7 is a flowchart illustrating a flow of processing of the management device according to the embodiment.

Processing contents of a management device according to the embodiment will be described with reference to FIG. 7. FIG. 7 is a flowchart illustrating a flow of processing of the management device according to the embodiment.

The communication controller 30 controls the reception unit 20 to receive the audio signal and the position information on the current position from each of the communication terminals 12 (Step S100). Then, the process proceeds to Step S102.

The determination unit 32 determines whether or not an emergency situation has occurred in the communication terminals 12 (Step S102). Specifically, the determination unit 32 determines that an emergency situation has occurred when the audio signal includes audio of threatening someone, a gunshot, a scream, and audio of asking for help. The emergency situation indicates that the communication terminal 12 is in an emergency state in which, for example, the user of the communication terminal 12 or the surroundings of the communication terminal 12 is in imminent danger. The determination unit 32 determines the type of the emergency situation based on the audio, for example. When it is determined that there is an emergency situation (Step S102; Yes), the process proceeds to Step S104. When it is not determined that there is an emergency situation (Step S102; No), the process proceeds to Step S122.

Figure 8:
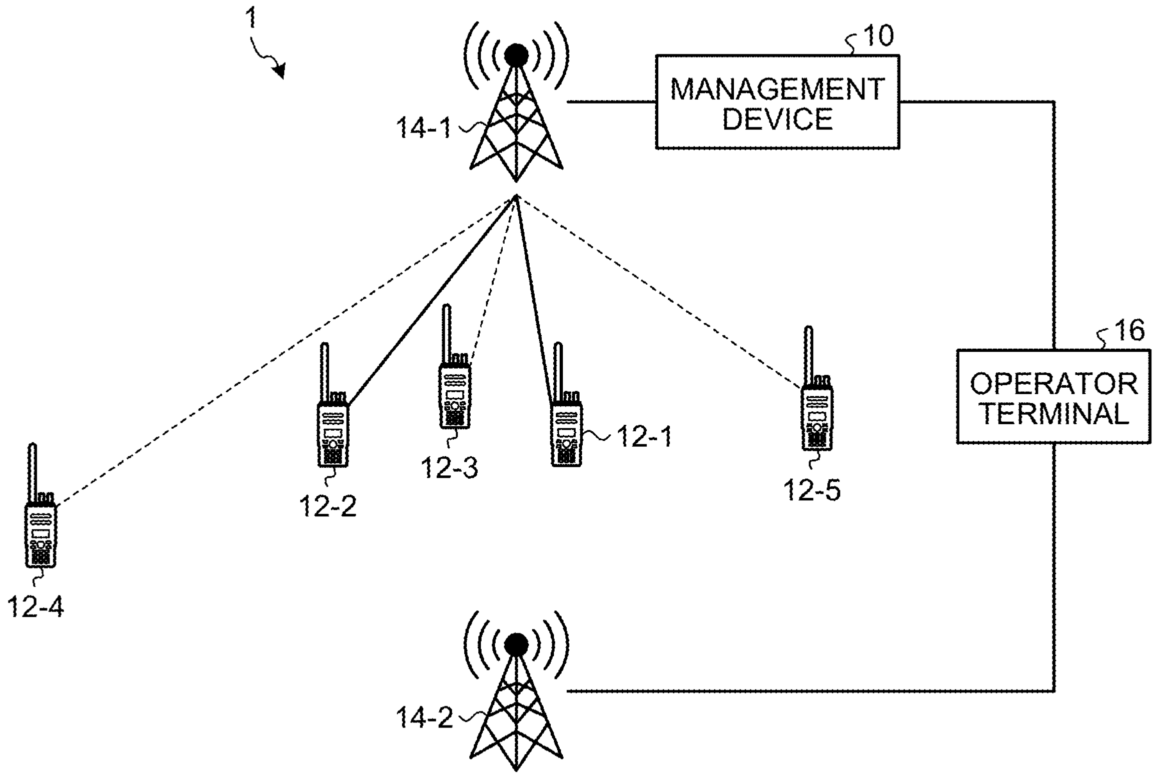
FIG. 8 is a diagram for explaining a method according to the embodiment for judging whether multiple communication terminals are in an emergency situation.

When it is determined as Yes in Step S102, the determination unit 32 determines whether or not the multiple communication terminals 12 in proximity are in the emergency situation (Step S104). Specifically, the determination unit 32 determines whether or not the multiple terminals in proximity are in the emergency situation based on the position information of each of the communication terminals 12. FIG. 8 is a diagram for explaining a method according to the embodiment for determining whether or not the multiple communication terminals are in the emergency situation. FIG. 8 illustrates the communication terminal 12-1 to the communication terminal 12-5. In the example illustrated in FIG. 8, the determination unit 32 determines that the communication terminal 12-1 and the communication terminal 12-2 are in the emergency situation as the multiple communication terminals 12 in proximity. In the present embodiment, the proximity means, for example, that a range there of is within 20 m, but is not limited thereto. When it is determined that the multiple communication terminals 12 in proximity are in the emergency situation (Step S104; Yes), the process proceeds to Step S106. When it is not determined that the multiple communication terminals 12 in proximity are in the emergency situation (Step S104; No), the process proceeds to Step S108.

When it is determine as Yes in Step S104, the determination unit 32 calculates reliability (Step S106). In the present embodiment, the reliability refers to a degree of reliability of occurrence of an emergency situation in the communication terminal 12. For example, the larger the number of communication terminals 12 determined as being in the emergency situation, the higher the reliability is calculated by the determination unit 32. For example, the larger volume of the audio related to the audio signal received from the communication terminal 12 determined as being in the emergency situation, the higher the reliability is calculated by the determination unit 32. For example, the higher a recognition degree of the audio of threatening someone and the audio of asking for help regarding the audio signal received from the communication terminal 12 determined as being in the emergency situation, the higher the reliability rate is calculated by the determination unit 32. For example, the determination unit 32 calculates the reliability in three stages such as "high", "medium", and "low". For example, the determination unit 32 may calculate the reliability by a numerical value. In the present embodiment, the wireless communication system 1 may execute processing in which the communication terminal 12 in the higher reliability can preferentially call the operator terminal 16. For example, the determination unit 32 may calculate the reliability by another method. Then, the process proceeds to Step S110.

When it is determined as No in Step S104, the determination unit 32 sets the reliability as a reference value (Step S108). The user of the management device 10 may set the reliability to an arbitrary value. Then, the process proceeds to Step S110.

Figure 9:
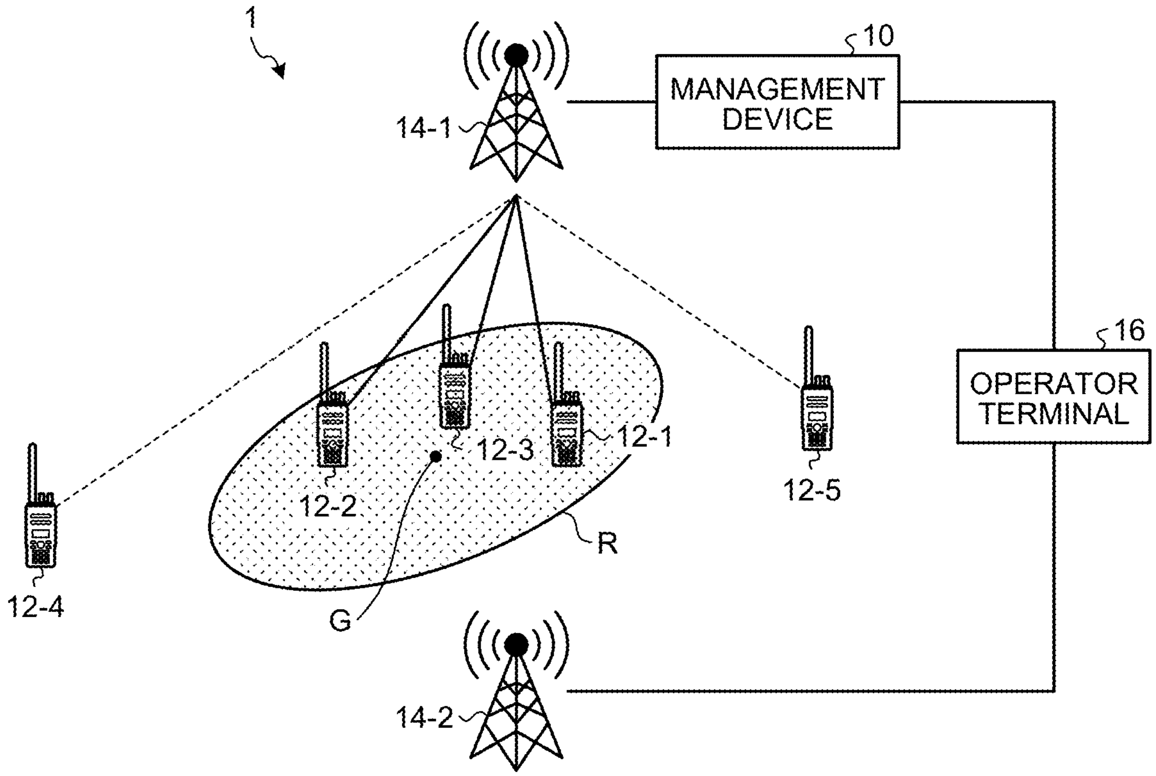
FIG. 9 is a diagram for explaining a method for determining an influence range of an emergency situation according to the embodiment.

The decision unit 34 decides an influence range of the emergency situation (Step S110). Specifically, for example, the decision unit 34 decides the influence range to which the emergency situation extends according to the positional relationship of the communication terminals 12. FIG. 9 is a diagram for explaining a method for deciding the influence range of the emergency situation according to the embodiment. In the example illustrated in FIG. 9, the decision unit 34 decides the influence range of the emergency situation based on the positional relationship between the communication terminal 12-1 and the communication terminal 12-2 which are determined as being in the emergency situation. For example, the decision unit 34 calculates barycenter coordinates G of the communication terminal 12-1 and the communication terminal 12-2 based on the position information of the communication terminal 12-1 and the position information of the communication terminal 12-2. For example, the decision unit 34 calculates variance of the position information of the communication terminal 12-1 and the communication terminal 12-2 based on the position information of the communication terminal 12-1 and the position information of the communication terminal 12-2. Then, the decision unit 34 calculates the influence range R based on the calculated barycentric coordinates G and the calculated variance. For example, the decision unit 34 may perform weighting according to the type of the emergency situation and change the influence range R according to the type of the emergency situation. The decision unit 34 may decide the influence range of the emergency situation using another method. Then, the process proceeds to Step S112.

The specification unit 36 specifies a transmission destination communication terminal which is a transmission destination of a control signal for controlling communication by the second wireless communication system (Step S112). Specifically, the specification unit 36 specifies the transmission destination communication terminal based on the influence range decided by the decision unit 34. In the example illustrated in FIG. 9, the communication terminal 12-1, the communication terminal 12-2, and the communication terminal 12-3 are located within the influence range R. In this case, the specification unit 36 specifies three communication terminals from the communication terminal 12-1 to the communication terminal 12-3 as the transmission destination communication terminals among the communication terminal 12-1 to the communication terminal 12-5. Then, the process proceeds to Step S114.

The determination unit 32 determines whether or not there is a communication terminal that is not in the emergency situation among the transmission destination communication terminals (Step S114). In the example illustrated in FIG. 9, the determination unit 32 determines that the communication terminal 12-3 positioned within the influence range R is a communication terminal that is not in the emergency situation. When it is determined that there is a communication terminal not in the emergency situation (Step S114; Yes), the process proceeds to Step S116. When it is not determined that there is a communication terminal not in the emergency situation (Step S114; No), the process proceeds to Step S118.

When it is determined as Yes in Step S114, the communication controller 30 controls the transmission unit 22 to transmit an alarm signal to the communication terminal 12-3 by the first wireless communication system (Step S116). As a result, the communication terminal 12-3 outputs an alarm indicating that the communication terminal 12 in the emergency situation exists in the vicinity. Then, the process proceeds to Step S118.

When it is determined as No in Step S114, and after Step S116, the communication controller 30 controls the transmission unit 22 to transmit a control signal to the transmission destination communication terminals by the first wireless communication system (Step S118). Specifically, in the example illustrated in FIG. 9, the communication controller 30 transmits, by the first wireless communication system, a control signal for controlling communication of the second wireless communication system, to the communication terminal 12-1 to the communication terminal 12-3. As a result, the communication terminal 12-1 to the communication terminal 12-3 transition to the emergency mode. Then, the process proceeds to Step S120.

The communication controller 30 controls the transmission unit 22 to transmit determination information to the operator terminal 16 (Step S120). Specifically, the communication controller 30 controls the transmission unit 22 to transmit determination information regarding the communication terminals 12 in the emergency situation determined in Step S102 to the operator terminal 16. As a result, an operator of the operator terminal 16 can grasp the communication terminals 12 in the emergency situation.

The controller 26 determines whether or not the processing is ended (Step S122). Specifically, the controller 26 determines to end the processing, for example, when the operation of the communication terminal 12 included in the wireless communication system 1 ends. When it is determined to end the processing (Step S122; Yes), the processing of FIG. 7 ends. When it is not determined to end the processing (Step S122; No), the process returns to Step S100.

As described above, in the present embodiment, when the communication terminal 12 is determined as being in the emergency situation, the communication terminal 12 determined to be in the emergency situation can be automatically transitioned to the emergency mode. Accordingly, safety can be improved.

Each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in an arbitrary unit according to various loads, usage conditions, and the like. Note that this configuration by distribution and integration may be performed dynamically.

Although the embodiments of the present application has been described, the present application is not limited by these embodiments. The components described above include one that can easily be thought of by a person skilled in the art and one that is practically identical. Further, the configurations described above may be combined appropriately. Furthermore, within the scope not departing from the gist of the present application, various omission, replacement, and modifications of the components may be made.

The wireless communication system and the control method of the wireless communication system according to the present application are available for the wireless communication system.

According to the present application, it is possible to determine an influence range of an emergency situation and to immediately communicate with a user within the influence range.

What is claimed is:

1. A wireless communication system comprising a management device, an operator terminal, and at least one wireless communication terminal, wherein the management device comprising:

a reception unit configured to receive, from at least one communication terminal having a first wireless communication system, an audio signal and position information by the first wireless communication system;

a determination unit configured to determine whether or not a signal indicating an emergency situation has been received from the at least one communication terminal based on the audio signal of the communication terminal received by the reception unit;

a decision unit configured to decide an influence range of the emergency situation based on a positional relationship of the at least one communication terminal when the determination unit determines that the emergency situation has occurred;

a specification unit configured to specify a transmission destination communication terminal that is a transmission destination of a control signal including an emergency signal according to the emergency situation based on the influence range of the emergency situation decided by the decision unit; and a transmission unit configured to transmit, by the first wireless communication system, information determined by the determination unit to an operator terminal and the control signal to the transmission destination communication terminal specified by the specification unit;

the operator terminal comprising:

a communication unit configured to receive, by the first wireless communication system, the position information and the audio signal transmitted by the at least one wireless communication terminal and information on the transmission destination communication terminal specified by the specification unit in the management device, and to transmit, by a second wireless communication system different from the first wireless communication system, an audio signal of an operator of the operator terminal to the at least one wireless communication terminal; and a display configured to display the information on the transmission destination communication terminal; and the at least one wireless communication terminal comprising:

a first communication unit configured to perform communication by the first wireless communication system;

a second communication unit configured to perform communication by the second wireless communication system; and a controller configured to control the first communication unit and the second communication unit, wherein the first communication unit is further configured to transmit the audio signal to the management device to generate the control signal in the management device and receive the control signal from the management device;

the controller is further configured to control the second communication unit based on the control signal; and the second communication unit is further configured to transmit/receive the audio signal to/from the operator terminal.

2. The wireless communication system according to claim 1, wherein the specification unit in the management device is further configured to specify, as the transmission destination communication terminal, the communication terminal which is included in the influence range of the emergency situation and is not determined as being in the emergency situation.

3. The wireless communication system according to claim 1, wherein the determination unit in the management device is further configured to calculate reliability for the emergency situation based on the audio signal received by the reception unit.

4. The wireless communication system according to claim 3, wherein the wireless communication terminal is able to communicate with the operator terminal more preferentially as the reliability calculated by the determination unit in the management device becomes higher.

5. A control method of a wireless communication system comprising a management device, an operator terminal, and at least one of wireless communication terminals, wherein the management device comprising:

receiving, from the at least one communication terminal having a first wireless communication system, an audio signal and position information by a first wireless communication system;

determining whether or not a signal indicating an emergency situation has been received from the at least one communication terminal based on the audio signal of the communication terminal received by the receiving;

deciding an influence range of the emergency situation based on a positional relationship of the at least one communication terminal when the determining determines that the emergency situation has occurred;

specifying a transmission destination communication terminal that is a transmission destination of a control signal including an emergency signal according to the emergency situation based on the influence range of the emergency situation decided by the decisioning; and transmitting, by the first wireless communication system, information determined by the determining to the operator terminal and the control signal to the transmission destination communication terminal specified by the specifying;

the operator terminal comprising:

receiving, by the first wireless communication system, the position information and the audio signal transmitted by the at least one wireless communication terminal and information on the transmission destination communication terminal specified by the specifying in the management device, and transmitting, by a second wireless communication system different from the first wireless communication system, an audio signal of an operator of the operator terminal to the at least one wireless communication terminal; and displaying the information on the transmission destination communication terminal; and the at least one wireless communication terminal comprising:

performing communication by the first wireless communication system by controlling a first communication unit; and performing communication by the second wireless communication system by controlling a second communication unit;

transmitting the audio signal to the management device to generate the control signal in the management device and receiving the control signal from the management device by the first communication unit;

controlling the second communication unit based on the control signal; and transmitting/receiving the audio signal to/from the operator terminal by the second communication unit.

* * * * *